Nov. 3, 1953     D. L. BLANEY     2,657,932
COMBINATION PHOTOGRAPHIC AND MAGNETIC SOUND
RECORD AND METHOD FOR PRODUCING SAME
Filed April 16, 1949
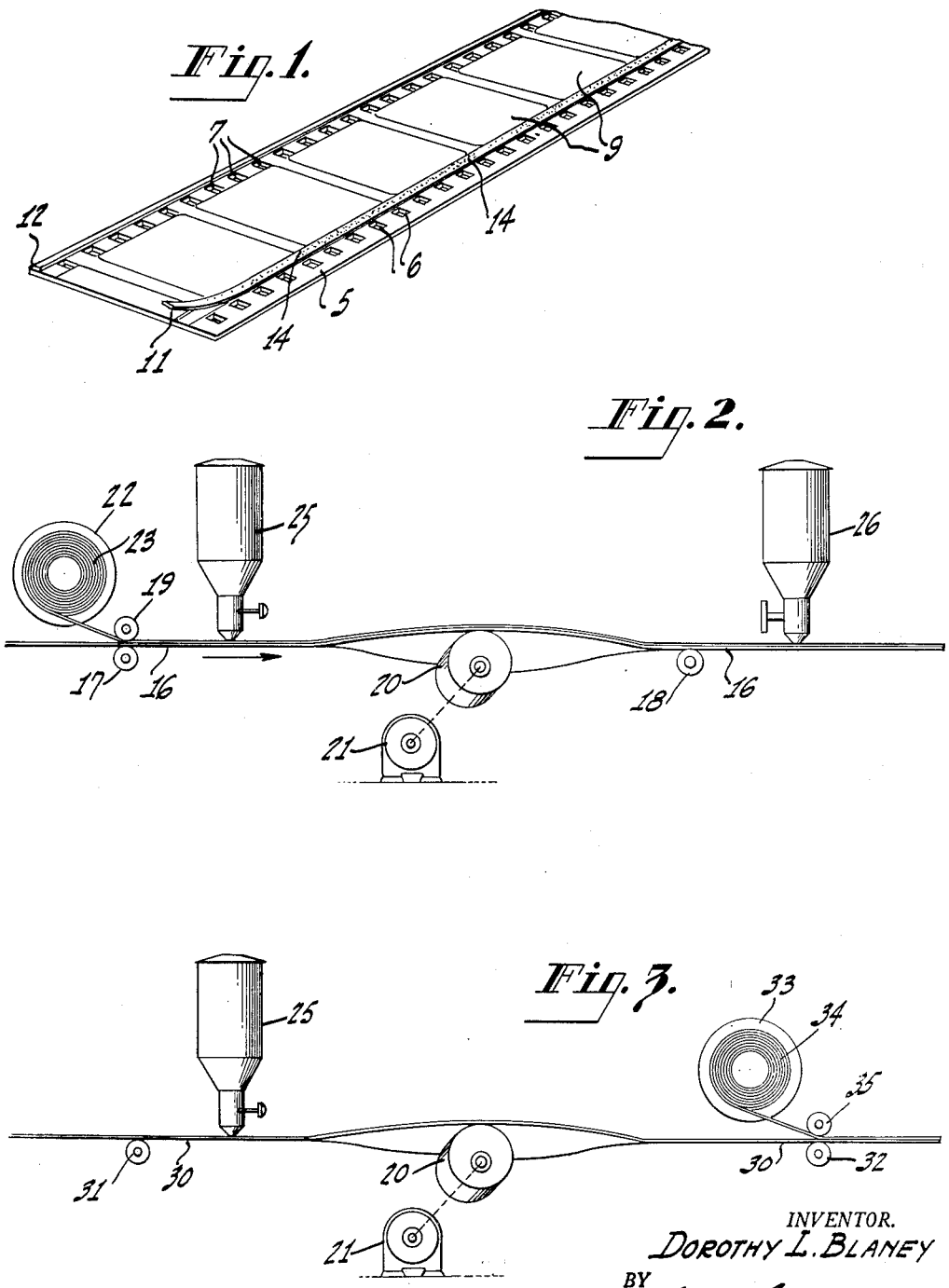
INVENTOR.
DOROTHY L. BLANEY
BY
ATTORNEY Patented Nov. 3, 1953

2,657,932

UNITED STATES PATENT OFFICE 2,657,932

COMBINATION PHOTOGRAPHIC AND MAGNETIC SOUND RECORD AND METHOD FOR PRODUCING SAME

Dorothy L. Blaney, Los Angeles, Calif., assignor to Radio Corporation of America, a corporation of Delaware Application April 16, 1949, Serial No. 87,924

5 Claims. (Cl. 274—3)

1

This invention relates to magnetic sound record production, and particularly to the duplication or copying of magnetic records which may be reproduced either magnetically or photographically.

Since the recording of sound on magnetic record mediums, such as tapes and films, is becoming more prevalent, the problem of duplicating or copying the magnetic sound records has been presented. Copies of photographic records are produced by photographically printing from negatives to positives, either by contact or optically, or by rerecording, the latter being generally used in the original combination of a plurality of sound records into a composite record. Since magnetic records are usually opaque or on opaque bases, the photographic type of copying is not suitable in the ordinary manner. Magnetic record copies may still be made by the rerecording process, but this process is not too practical when a large number of prints are desired.

The present invention is directed to a copying method and system, and one which will not only provide a magnetic duplicate of the original magnetic record, but one which may be attached to a photographic picture film and be reproduced with the ordinary photographic reproducing system, as well as with a magnetic reproducing system. The invention, therefore, is a particularly flexible copying method and system, since copies of a magnetic sound track can be produced which will function in either a photographic or a magnetic reproducing system.

The principal object of the invention, therefore, is to facilitate the copying or reproduction of duplicate magnetic sound records.

Another object of the invention is to provide an improved method of and system for copying or duplicating magnetic sound records.

A further object of the invention is to provide an improved sound record which may be reproduced, either photographically or magnetically.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a perspective view of a section of a motion picture film embodying the invention.

Fig. 2 is a diagrammatic view of one modification of the invention, and

Fig. 3 is a diagrammatic view of a second modification of the ivention.

Referring now to the drawings, in which the same numerals identify like elements, a thirty-five millimeter motion picture film section 5 is represented with its regular rows of sprocket holes 6 and 7 and the picture frame section 9. A record of the type produced with the invention to be described, is shown as a strip 11, which is glued in the longitudinal area between the picture frames 9 and the sprocket holes 6, which is the portion of the film occupied by the normal photographic sound track or record. A narrow strip 12 is shown glued to the other edge of the film to facilitate uniform winding of the film on supply and take-up reels. The strip 11 is of thin, transparent material, on which are the finely divided iron oxide particles, shown by the strippled areas 14, and which intercept the light to permit the track to be reproduced photographically in the same manner as the silver grains of a sound track image, or which vary the magnetism in a magnetic reproducing head to reproduce the track magnetically. Although a thirty-five millimeter film section is shown for purposes of illustration, the invention is applicable to films of any width.

Referring now to Fig. 2, a method of and system for producing the strip 11 is illustrated. The original record is recorded on a strip of magnetic film or tape 16, with or without sprocket holes, and is adapted to be advanced in any suitable manner over a plurality of rollers or capstans, such as shown at 17 and 18. Intermediate the rollers 17 and 18, the film is tilted at an angle of substantially forty-five degrees by an eccentrically mounted shaker roller or capstan 20, shown diagrammatically, and which is driven by a motor 21. From a reel 22, a roll of transparent transfer strip 23, such as shown at 11 in Fig. 1, passes under a roller 19, directly above roller 17, the original magnetic sound record 16 and strip 23 being brought into contact between the rollers 17 and 19. As the original strip 16 and the transfer strip 23 move in the direction of the arrow, finely divided magnetic oxide particles from a supply reservoir 25 are dropped or sprinkled on the upper surface of the strip 23. As the two strips 16 and 23 pass over the shaker roller 20, the magnetic particles are shaken from the strip 23, except where they are held thereon by the magnetism in the original record. Thus, when the strips flatten out over roller 18, the amount and distribution of the magnetic particles adhering to the strip 23 will be in accordance with the variations in intensity of the magnetism in the original sound track.

The strips continue in contact, and, as they pass under a reservoir 26, an adhesive binder or coating from the reservoir, which will make the particles firmly stick to the strip 23, is applied thereto. The strip 23 may be easily separated from the original magnetic record carrier 16, and, after the binder has dried, the strip may be used in that form to modulate a light beam or a magnetic reproducing head. As shown in Fig. 1, the strip may be glued to a film, such as shown at 5, in the position of the normal photographic sound track area. The strip may be applied to the film 5 so that the particles lie between the strip and the film, or it may be glued so that the particles are on the upper side of the strip 11 or 23. With the particles between the strip and the film, an exceptionally smooth surface for contacting the gap of a magnetic reproduce head is provided. The binder or coating may be a transparent shellac. Since the film base 5 is rendered transparent along the sound track area and the strip 11 is transparent, the opaque iron filings will vary the light transmission between an exciter lamp and a photocell in the same manner as the silver grains of a normal photographic sound track. Also, the magnetic particles are magnetized in accordance with the original record, and thus, are reproducible with a magnetic pickup head.

Although Fig. 2 shows the strips 23 and 16 in contact as they leave the reservoir 26, the strip 23 may be continuously applied to the film 5 so that the final operation produces the composite film shown in Fig. 1, the binder and particles lying between the base of strip 23 or 11 and the film 5 as the film is wound on a reel.

Referring now to Fig. 3, a second modification, including a method of and system for duplicating a magnetic record on a strip 30, is shown. The strip 30 is advanced in the same manner as the strip 16 over a plurality of rollers 31 and 32, the system also using the same shaker roller 20 and motor 21. The container 25 contains the finely divided magnetic oxide particles; but, in this instance, they are applied directly to the film 30 as it passes under the container, the particles being shaken from the film 30 in accordance with the intensity of the magnetism in the original sound record. The strip 30 then flattens out, and, from a reel 33, a roll of strip 34 is brought into contact with the particles. The strip 34, in this instance, carries a sticky emulsion on the lower side which will be pressed onto the particles as the strips pass between rollers 32 and 35. The strip 34 may then be separated from the magnetic tape 30, the particles adhering to the strip 34 to form a copy of the sound record on the magnetic medium 30. The sticky emulsion is then allowed to set and the strip 34 is then usable as is in the same manner as the strips 11 and 23 or be attached to a film as shown in Fig. 1.

I claim:
1. The method of producing copies of a magnetic sound record in a magnetic medium in which variations in magnetism occur in a uniform layer of magnetic particles comprising applying a thin strip of material to said magnetic medium, depositing magnetic particles on said strip, distributing said particles on said strip of material in accordance with the intensity and distribution of the magnetism in said magnetic medium and magnetizing said particles on said strip of material in accordance with the intensity and distribution of the magnetism in said magnetic medium, and depositing a binder on said particles to retain them in said distributed positions on said strip.

2. A combination motion picture film and sound record therefor comprising a motion picture film, a strip of transparent material attached to said film along the normal longitudinal position of the photographic sound track area, said transparent strip having magnetic particles distributed thereon in accordance with the amplitude and frequency of a sound record and magnetized in accordance with the amplitude and frequency of said sound record, said strip interfering with the passage of light therethrough at points where said particles have been deposited, and in an amount determined by the number of said particles along said strip.

3. The method of copying a magnetic sound record from a magnetic medium in which variations in magnetism occur in a uniform layer of magnetic particles for either photographic or magnetic reproduction comprising applying a strip of material to said magnetic medium, depositing magnetic particles on said strip, distributing said particles in accordance with said variations in magnetism in said magnetic sound record and magnetizing said particles in accordance with said variations in magnetism in said magnetic sound record, and depositing a binder on said particles to fixedly adhere said particles to said strip, said particles interrupting light for photographic reproduction and producing magnetic variations for magnetic reproduction.

4. A combination photographic and sound record comprising a strip of material, said strip having magnetic particles distributed thereon in accordance with the variations in amplitude and frequency of a signal and magnetized in accordance with the variations in amplitude and frequency of said signal, said strip interfering with the passage of light therethrough at points where said particles have been deposited and in an amount determined by the number of said particles at said points.

5. A photographic sound record comprising a transparent base and finely divided opaque metallic particles distributed thereon, the position and number of said particles along said base corresponding to the variations of a signal to be reproduced by the modulation of a light beam therethrough, said base interfering with the passage of light in accordance with the number of said particles deposited along said base, said particles being magnetized in accordance with the variations in amplitude of a signal to be reproduced for reproducing said signal by the modulation of a magnetic head therewith.

DOROTHY L. BLANEY.

(References on following page)

References Cited in the file of this patent

UNITED STATES PATENTS

| Number | Name | Date |
|---|---|---|
| 450,087 | Osborn | Apr. 7, 1891 |
| 934,601 | Fuller | Sept. 21, 1909 |
| 995,289 | Price | June 13, 1911 |
| 1,152,562 | Sherman | Sept. 7, 1915 |
| 1,213,150 | Bullis | Jan. 23, 1917 |
| 1,574,835 | Maclean | Mar. 2, 1926 |
| 1,653,467 | O'Neill | Dec. 20, 1927 |
| 1,832,097 | Chipman | Nov. 17, 1931 |
| 1,854,071 | Schacht | Apr. 12, 1932 |
| 1,883,559 | Chipman | Oct. 18, 1932 |
| 1,883,562 | Chipman et al. | Oct. 18, 1932 |
| 1,889,380 | Ruben | Nov. 29, 1932 |
| 1,912,887 | Chipman | June 6, 1933 |
| 2,011,006 | Maclean | Aug. 13, 1935 |
| 2,215,502 | Harper | Sept. 24, 1940 |
| 2,479,868 | Rossman et al. | Aug. 23, 1949 |
| 2,559,505 | Hillier | July 3, 1951 |
| 2,585,913 | Camras | Feb. 19, 1952 |
| 2,608,127 | Redfield | Aug. 26, 1952 |

FOREIGN PATENTS

| Number | Country | Date |
|---|---|---|
| 333,755 | Great Britain | Aug. 21, 1930 |
| 371,329 | Great Britain | Oct. 17, 1930 |